Patented Oct. 27, 1942

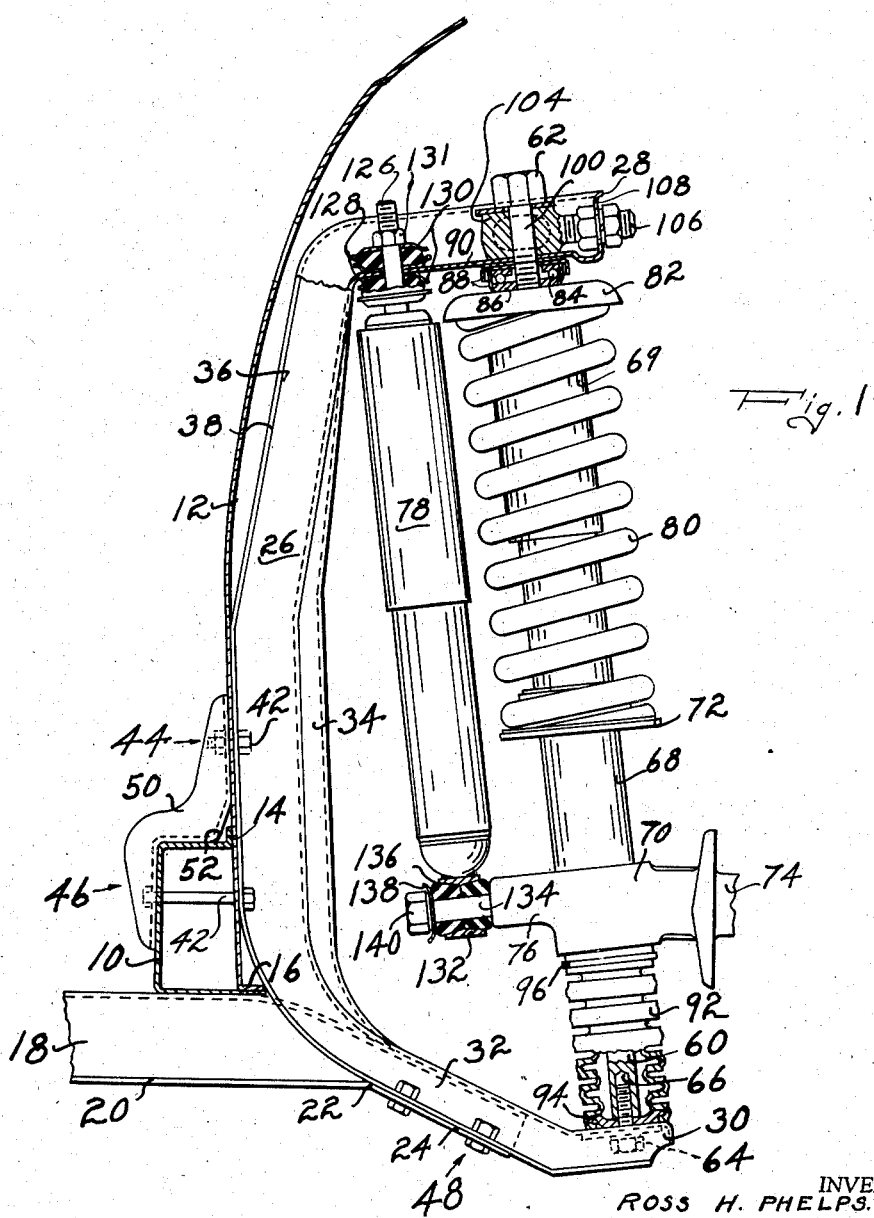

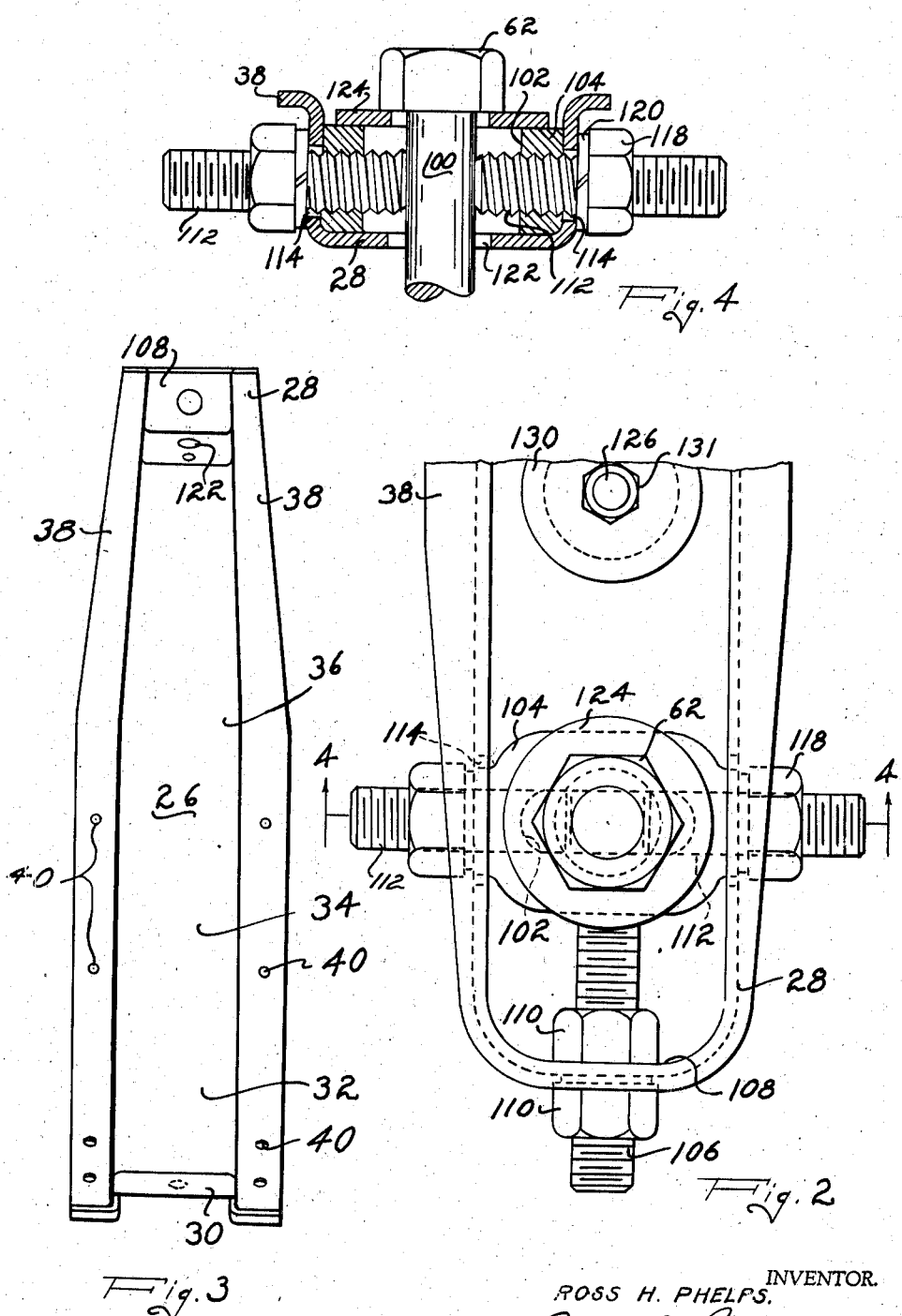

2,299,926

UNITED STATES PATENT OFFICE 2,299,926

AUTOMOTIVE SUSPENSION

Ross H. Phelps, Kenosha, Wis., assignor to Nash-Kelvinator Corporation, Kenosha, Wis., a corporation of Maryland Application June 13, 1940, Serial No. 340,236

15 Claims. (Cl. 280—96.2)

This invention relates to automotive suspensions and has particular reference to means for independently mounting the wheels of an automobile and the method of assembling the suspension.

It is the object of this invention to provide means for mounting a wheel of an automobile which will permit the wheel and spring to be mounted as a sub-assembly on the complete chassis of the automobile.

It is another object of this invention to provide a novel means for mounting the coil spring and shock absorber on an automobile.

Another object of this invention is to provide novel means for assembling an automotive wheel suspension of the rigid king pin type, which means will permit easy adjustment of the caster and camber angles of the wheel.

Other objects and advantages of this invention will be apparent from a study of the following description and claims and the attached drawings of which there are two sheets and in which:

Figure 1 represents a vertical transverse section through the wheel house and the frame of an automobile taken along the center line of the front wheels;

Figure 2 represents a top plan view of the structure illustrated in Figure 1;

Figure 3 represents a side elevational view of the main supporting bracket illustrated in Figures 1 and 2; and, Figure 4 represents a sectional view taken along a plane indicated by the line 4—4 in Figure 2 and looking in the direction of the arrows.

The drawings illustrate the invention as applied to an automobile in which the frame is made as an integral part of the body; however the invention is not limited to use in automobiles of this type. Shown in the drawings is an automobile having a side rail strengthening member 10 which is channel-shaped in cross section and is joined as by welding to the body panel 12 which forms the inside of the wheel house of the automobile. Side rail member 10 is provided with the upturned flange 14 which is welded to the panel 12, and the bottom of panel 12 is provided with the outturned horizontal flange 16 which is welded to the bottom flange of the channel-shaped side rail 10. Secured on the under side of the side rail 10 is a cross member or rigid axle 18 which is channel shaped in cross section, having its flanges downwardly presented, and the web portion of its cross section abutted against the bottom flange of the side rail 10. The downwardly presented flanges of the cross member 18 are turned outwardly in horizontal flanges 20. Toward the end of the cross member 18, past the side rail member 10, the cross member 18 is bent downwardly as at 22 to form the sloping surface 24 and is slightly reduced in cross sectional dimensions.

The wheel supporting structure consists of a generally C-shaped frame 26 which is provided with an upper end portion 28 and a lower end portion 30 which are arranged parallel to each other. From the lower end portion 30, the C-frame 26 is bent upwardly along a sloping plane as at 32 and then curved into the generally vertical section 34, which vertical section is bent outwardly at 36 and then bent sharply into the upper end portion 28. The various shapes and bends of the C-member are arranged so that the sloping section 32 will register with the downwardly bent sloping portion 24 of the cross member 18 while the vertical section 34 abuts against the lower portion of the wheel house 12 opposite the side rail member 10. The outwardly bent portion 36 of the C-frame is arranged to clear the wheel house 12 as the wheel house curves outwardly toward a position over the wheel, which is not shown.

The C-frame 26 is generally channel-shaped in cross section as is illustrated in Figure 4 and is arranged with the web of its channel section along its inside surface. The side flanges of the C-frame 26 are bent outwardly forming two flanges 38 along each side of the C-frame which are parallel to the web section of the C-frame. The flanges 38 are apertured as at 40 (see Figure 3) to pass the bolts 42 by means of which the C-frame 26 is secured to the body of the automobile. Bolts 42 are provided through the wheel house at 44, through the wheel house and side rail member 10 at 46, and through the sloping flange 24 of the cross member 18 at 48. It will be noted that the bolts 42 through the wheel house 12 and side rail member 10 indicated at 46 are longer than the other bolts as they extend completely through the space between the wheel house and the side rail member 10.

In order to reinforce the connection between my C-frame 26 and the body of the automobile, I have provided the bracket 50 which is generally Z-shaped having one surface secured to the web of the side rail member 10, one surface abutted against the upper flange of the side rail member 10, and one surface secured to the wheel house 12 above the side rail member 10. The upper surface of the bracket 50 is relieved as at 52 in order to clear the flange 14 on the side rail member 10. The bolts 42 passed through the wheel house at 44 and 46 are also passed through the bracket 50 which is channel-shaped in cross section having two flanges facing inwardly from the wheel house 12 and side rail member 10. The bracket 50 may be held in place by the bolts at 44 and 46, but is preferably welded securely to the side rail member 10 and the inside of the wheel house 12 so as to form an integral part of the side rail member 10 at the point where the C-frame 26 is attached.

The wheel supporting and springing mechanism which is supported by the C-frame 26 consists of a generally vertical, rigid, king pin 60 which is secured between the parallel ends 28 and 30 of C-frame 26 by means of the cap screws 62 and 64 which are passed through the web portion of the C-frame 26 into holes 66 tapped in the ends of the king pin 60. Carried around the king pin 60 is a sleeve 68 on which is mounted the steering knuckle 70 and a spring seat 72. Steering knuckle 70 has formed thereon a spindle 74 which is arranged to support the wheel of the automobile (not shown) and an arm 76 which forms the lower abutment for a strut type shock absorber 78. The upper end of sleeve 68 slides within a dust shield 69. Suitable bearing means are provided between the surface of the king pin 60 and the inside surface of the sleeve 68 so that the sleeve will move smoothly up and down the king pin 60 and will rotate about the king pin 60 as the steering knuckle is turned to steer the automobile. Supported on the spring seat 72 is the lower end of coil spring 80, the upper end of which abuts against the downwardly cup-shaped member 82 which forms the upper spring seat. The upper spring seat 82 is supported against the thrust of the spring by means of bearings 84 retained between the races 86. The bearing 84 and races 86 are retained in suitable sleeves 88 which abut against a washer 90 positioned against the under side of the web section of the C-frame 26 at its upper end 28.

The lower end of the king pin is shielded from dust by a flexible bellows 92 which is held in place at the bottom under a flanged washer 94 on which the lower end of the king pin 60 rests, and at the upper end by a clamp ring 96 secured around the lower end of the sleeve 68. The manner in which this type of suspension including the rigid king pin 60, sleeve 68, steering knuckle 70, shock absorber 78, and coil spring 80 operates is more particularly described and claimed in the co-pending application of Nils Erik Wahlberg, Serial No. 312,656, filed January 6, 1940, for Wheel suspensions.

The cap screw 62, which secures the upper end of the king pin 60 to the C-frame 26 is provided with a long shank 100 which is passed through a longitudinally elongated vertical slot 102 formed in a block 104. Block 104 is prepared to fit snugly within the channel-shaped cross section of the upper end 28 of the C-frame 26. Formed on the outer side of the block 104 is a threaded lug 106 which extends through the wall 108 at the end of the C-frame 26. Wall 108 is formed by stamping over the end of the web of the C-frame. Nuts 110 are threaded on the lug 106 on each side of the wall 108 so that by turning the nuts along the lug 106 the position of the block 104 may be moved nearer or farther from the wall 108. The sides of the elongated slot 102 in the block 104 will draw the shank 100 of the cap screw 62 along with the block 104, and movement of the cap screw 62 will move the upper end of the king pin to the right or left as viewed in Figure 1 and change the camber setting of the spindle 74 on which the wheel is mounted. Thus as the nuts 110 are turned along the lug 106 to a point closer to the block 104, the camber setting of the wheel will be increased while reverse movement of the nuts 110 will decrease the camber.

In order to maintain the position of the cap screw 62 in the slot 102, the block 104 is apertured on its forward and back sides to pass the threaded pins 112 which extend in longitudinally aligned relationship into each end of the oval slot 102 and abut against the shank 100 of cap screw 62. Pins 112 extend through apertures 114 formed in the flanges of the C-frame 26, and are provided with the nuts 118 on the outside of the C-frame. Lock washers 120 are provided between the nuts 118 and flanges of the C-frame 26. By loosening the nuts 118, unscrewing one of the bolts 112 and tightening the opposite one, the shank 100 of the cap screw 62 will be moved toward the front or toward the rear of the automobile depending upon which of the bolts 112 is tightened. This movement of the cap screw 62 serves to move the top end of the king pin 60 forwardly or backwardly, thus tilting the king pin and changing the caster adjustment of the wheel. Tightening the right hand bolt 112 as viewed in Figures 2 and 4 will decrease the caster adjustment or give a negative adjustment. The reverse adjustment will, of course, increase the positive caster adjustment.

It will be noted that the aperture 122 in the web portion of the C-frame 26 which passes the shank 100 of the cap screw 62 is considerably larger than the shank 100 so that the shank may be moved as has just been described. The apertures 114 in the flanges of the C-frame 26 which pass the pins 112 are oval-shaped or elongated in a transverse horizontal direction so that as the block 104 is moved by turning the nuts 110, the pins 112 will not interfere or prevent the movement of the block. I have also provided the washer 124 between the top surface of the block 104 and the head of the cap screw 62 to prevent dirt from working into the slot 102 and from there into the aperture 122 to the bearings 84.

The shock absorber 78 is provided with an upper bayonet end 126 which is passed through the web of the C-frame 26 at its upper end 28. Rubber biscuits 128, retained between cup-shaped metal washers 130, are positioned on each side of C-frame 26 and around the bayonet end 126 to yieldingly support the upper end of the shock absorber and absorb noise. The rubber biscuits 128 also allow the shock absorber to assume various alignments with respect to the C-frame as the steering knuckle turns the lower end of the shock absorber. The biscuits are secured on the bayonet end 126 by a nut 131.

The lower end of the shock absorber 78 is provided with an eye 132 through which projects the bolt 134 secured on the arm 76 of the steering knuckle 70. Two tapered rubber bushings 136 are positioned within the eye 132 and around the bolt 134. A washer 138 is drawn down against the rubber bushings 136 by the nut 140 threaded on the end of bolt 134. The connection forms what is known in the art as a "Harris" bushing and allows the shock absorber to move and twist relative to the bolt 134. Thus the bolt 134 and shock absorber 78 may take new relative alignments as the steering knuckle is turned and will not pass high frequency vibrations and sound to the rest of the automobile.

From the above description it should be apparent that the wheel suspension mechanism may be assembled on the C-frame 26 as a bench assembly, and the entire suspension then bolted to the frame and body of the automobile by the bolts 42 as the body moves along a production line. This procedure is highly desirable, particularly in the case of a unitary type of body structure of which the frame member and body panels are made up as a unit, since it is more or less difficult to assemble the various parts of the suspension after the body panels such as the wheel house and fender have been joined with the frame. The coil spring 80 must be initially compressed because in its free position it is longer than the distance between the spring seats 72 and 82. The spring may be compressed as the king pin, sleeve and steering knuckle assembly is assembled in the C-frame or the spring may be compressed and clamped so it can be handled as a short spring while assembling the king pin assembly in the C-frame. The clamps may be taken from the spring after the shock absorber is assembled in the C-frame. The caster and camber settings of the suspension may be adjusted while the suspension unit is still at the assembly bench.

While I have described my invention in some detail, I intend the description to be an example only and not limiting on my invention to which I make the following claims.

I claim:

1. In an automobile having a side rail member and a cross member secured thereto, an end portion on said cross member extending beyond the side of said side rail member, a generally C-shaped frame, fastening means securing said C-shaped frame on the end of said cross member and to the side of said rail, a rigid king pin supported between the ends of said C-shaped frame, spring means supporting a steering knuckle on said king pin, said spring means abutting against said C-frame, and a strut type shock absorber positioned between said steering knuckle and the top of said C-frame.

2. In an automobile having a side rail member of channel-shaped cross section, a wheel house panel secured along the open side of said side rail member, a cross member secured on the lower side of said side rail member and extending therebeyond, a bracket supported between two sides of said side rail member and said wheel house panel, a frame secured to said side rail member, wheel house, the extending portion of said cross member and said bracket, parallel end portions formed on said frame, and wheel supporting mechanism supported between the ends of said frame.

3. In combination with an automobile having frame members with panel members secured thereto, wheel supporting mechanism comprising a C-frame having a web section and outturned flange sections, other flanges formed on said first flange sections, a king pin secured between the ends of said web sections, means for supporting a wheel on said king pin, a strut type shock absorber positioned between the web section of said C-frame and a portion of said last mentioned means, and clamping means for securing said other flange sections of said C-frame to said frame and panel members.

4. In combination with an automobile having strengthening members with body panels secured thereto, a C-frame secured to said strengthening members, said C-frame being channel-shaped in cross section with its flanges turned up at its top, a block defining an elongated slot positioned between said flanges at the top of said C-frame, a cap screw extending through said slot and said C-frame, a rigid king pin supported by said cap screw, screw means for changing the position of said block, and other screw means for changing the position of said cap screw in said slot.

5. In an automobile, a C-frame of channel-shaped cross section, said channel section being turned outwardly from said C-frame and having a wall connecting its flanges across the upper end thereof, means including a rigid king pin positioned between the arms of said C-frame for supporting a wheel, a block member defining a slot positioned within the channel section at the top of said C-frame, screw means attached to said block and extending through the wall at the end of said C-frame, nuts threaded on said screw means on each side of said wall, a cap screw extending through the slot in said block and the web of said C-frame to locate the top of said king pin, and threaded pins extending through said block into said slot to locate said cap screw in said slot, said threaded pins extending through the flanges of said channel section and having nuts thereon.

6. In an automobile, a rigid king pin, a steering knuckle slidable thereon, a coil spring telescoping said king pin and positioned between the end of said king pin and said steering knuckle, a generally trough-shaped member secured to said automobile and over the end of said king pin, a block defining a slot positioned in said trough-shaped member, a threaded lug extending from said block through a wall of said trough, aligned pins extending through other walls of said trough and said block into said slot, nuts on said lug on each side of said wall, nuts on said pins on each side of said trough, and a cap screw extending through said slot between said pins, said cap screw being engaged with said king pin.

7. In an automobile, a rigid king pin, a steering knuckle slidable thereon, a coil spring telescoping said king pin and positioned between the end of said king pin and said steering knuckle, a generally trough-shaped member secured to said automobile and over the end of said king pin, a block defining a slot positioned in said trough-shaped member, a threaded lug extending from said block through a wall of said trough, aligned pins extending through other walls of said trough and said block into said slots, nuts on said lug on each side of said wall, nuts on said pins on each side of said trough, a cap screw extending through said slot between said pins, said cap screw being engaged with said king pin, and a strut type shock absorber connected between said trough member and said steering knuckle.

8. In an automobile, a rigid supporting member having a channel-shaped cross section, each flange of said channel section defining a slot, the web of said channel section defining an aperture between said slots, a block positioned in said channel section and defining a slot normal to the slots in said flanges, a cap screw extending through the slot in said block and the aperture in the web of said channel section, pins extending through said slots and block into the slot in said block on each side of said cap screw, nuts screwed on said pins, means for moving said block along the axes of said slots in said flanges, and a king pin supported at its upper end by said cap screw.

9. In an automobile, a rigid supporting member having a channel-shaped cross section, each flange of said channel section defining a slot, the web of said channel section defining an aperture between said slots, a block positioned in said channel section and defining a slot normal to the slots in said flanges, a cap screw extending through the slot in said block and the aperture in the web of said channel section, pins extending through said slots and block into the slot in said block on each side of said cap screw, nuts screwed on said pins, means for moving said block along the axes of said slots in said flanges, a king pin supported at its upper end by said cap screw, and a strut type shock absorber secured at its upper end to said supporting member.

10. In an automobile having a rigid king pin with a steering knuckle slidable thereon, a coil spring telescoping said king pin and positioned between the end of said king pin and said steering knuckle from said automobile, means forming a horizontal wall and three side walls and supporting said king pin, a block defining a slot positioned between said side walls, two of said side walls defining slots extending at right angles to the slot in said block, a cap screw extending through the slot in said block and through the horizontal wall of said supporting means and secured to said king pin, pins extending through the slots in said side walls into the slot in said block, nuts on the outer ends of said pins, and a threaded member extending from said block through the end walls of said supporting means, said threaded member having nuts threaded thereon on each side of said end wall.

11. In an automobile having a king pin, means for adjusting the angle of said king pin comprising a support for one end of said king pin and defining an aperture, a block defining a slot carried on said support, means extending through the slot in said block and the aperture in said support connected to said king pin, said means having a smaller diameter than said aperture, pin means having nuts threaded thereon and adjustable against said support to locate said block, and other pin means extending into said slot and having a threaded connection with respect to said block to locate said means connected to said king pin with respect to said slot.

12. In an automobile having a side rail member and a cross member secured thereto, an end portion of said cross member extending beyond the side of said side rail member, a generally C-shaped frame, fastening means securing said C-shaped frame on the end of said cross member and to the side of said side rail member, a king pin supported between the ends of said C-shaped frame, a steering knuckle rotatably and slidably mounted on said king pin, and spring means positioned between said steering knuckle and said C-frame.

13. In combination with an automobile having frame members with panel members secured thereto, wheel supporting mechanism comprising a C-frame having a web section and out-turned flange sections, other flanges formed on said first flange sections, a king pin secured between the ends of said web sections, means for supporting a wheel on said king pin and clamping means for securing said other flange sections on said C-frame to said frame and panel members.

14. In combination with an automobile having strengthening members with body panels secured thereto, a C-frame secured to said strengthening members, said C-frame having a portion near one end thereof of channel shaped cross section, a block defining an elongated slot positioned between the flanges of said channel shaped cross section, a pin extending through said slot and said channel shaped cross section and slidable relative thereto, a king pin having one end secured to said first mentioned pin, screw means for changing the position of said block relative to said C-frame, and other screw means for selectively locating the position of said first mentioned pin in said slot.

15. In an automobile, a king pin, a steering knuckle slidable thereon, a coil spring telescoping said king pin and positioned between the end of said king pin and said steering knuckle, a generally trough shaped member secured to said automobile adjacent to one end of said king pin, a block positioned in said trough shaped member and defining a slot extending transversely of said trough shaped member, a threaded lug extending from said block through an end wall of said trough shaped member, pins extending through other walls of said trough shaped member and said block into said slot, nuts on said lug on each side of said side wall, said pins having a threaded connection with said block, and means secured to said king pin extending through said slot between said pins and selectively locatable in said slot by said pins.

ROSS H. PHELPS.